(12) United States Patent
Ferguson

(10) Patent No.: US 9,055,279 B2
(45) Date of Patent: Jun. 9, 2015

(54) SYSTEM FOR NATURAL LANGUAGE ASSESSMENT OF RELATIVE COLOR QUALITY

(75) Inventor: Kevin M. Ferguson, Beaverton, OR (US)

(73) Assignee: TEKTRONIX, INC., Beaverton, OR (US)

( * ) Notice: Subject to any disclaimer, the term of this patent is extended or adjusted under 35 U.S.C. 154(b) by 827 days.

(21) Appl. No.: 13/088,021

(22) Filed: Apr. 15, 2011

(65) Prior Publication Data

US 2012/0265532 A1 Oct. 18, 2012

(51) Int. Cl.
*G06K 9/00* (2006.01)
*G06K 9/03* (2006.01)
*G06F 17/27* (2006.01)
*H04N 17/00* (2006.01)
*G06T 7/00* (2006.01)

(52) U.S. Cl.
CPC ............ *H04N 17/004* (2013.01); *G06T 7/001* (2013.01)

(58) Field of Classification Search
CPC ................ G06T 2207/30168; G06T 7/0002; G06T 7/001; G06T 7/20; G08B 13/196; G08B 13/19602; G08B 13/19604
USPC ............................... 382/162, 165, 309; 704/9
See application file for complete search history.

(56) References Cited

U.S. PATENT DOCUMENTS

| 5,025,480 | A | * | 6/1991 | Morton et al. | 382/271 |
|---|---|---|---|---|---|
| 5,313,280 | A | | 5/1994 | Straus | |
| 5,883,968 | A | * | 3/1999 | Welch et al. | 382/100 |
| 6,421,462 | B1 | * | 7/2002 | Christian et al. | 382/219 |
| 6,463,426 | B1 | * | 10/2002 | Lipson et al. | 1/1 |
| 6,560,366 | B1 | * | 5/2003 | Wilkins | 382/236 |
| 6,829,389 | B1 | * | 12/2004 | Arakawa et al. | 382/218 |
| 2003/0025599 | A1 | * | 2/2003 | Monroe | 340/531 |
| 2003/0031368 | A1 | * | 2/2003 | Myler et al. | 382/228 |
| 2005/0094896 | A1 | * | 5/2005 | Masumura et al. | 382/276 |
| 2005/0265598 | A1 | * | 12/2005 | Noguchi et al. | 382/167 |
| 2006/0061654 | A1 | * | 3/2006 | McKay et al. | 348/143 |
| 2006/0140471 | A1 | * | 6/2006 | Murakami et al. | 382/145 |

(Continued)

FOREIGN PATENT DOCUMENTS

WO 03012725 A1 2/2003

OTHER PUBLICATIONS

EP Search Report for European Patent Application No. 12163801.9 dated Jul. 17, 2012, 3 pages.

*Primary Examiner* — Eric Yen
(74) *Attorney, Agent, or Firm* — Marger Johnson & McCollom PC

(57) ABSTRACT

Embodiments of the invention include a system for providing a natural language objective assessment of relative color quality between a reference and a source image. The system may include a color converter that receives a difference measurement between the reference image and source image and determines a color attribute change based on the difference measurement. The color attributes may include hue shift, saturation changes, and color variation, for instance. Additionally, a magnitude index facility determines a magnitude of the determined color attribute change. Further, a natural language selector maps the color attribute change and the magnitude of the change to natural language and generates a report of the color attribute change and the magnitude of the color attribute change. The output can then be communicated to a user in either text or audio form, or in both text and audio forms.

15 Claims, 6 Drawing Sheets

(56) References Cited

U.S. PATENT DOCUMENTS

| | | | |
|---|---|---|---|
| 2006/0268345 A1* | 11/2006 | Silverstein | 358/3.26 |
| 2006/0274936 A1* | 12/2006 | Ohkubo et al. | 382/167 |
| 2007/0058859 A1* | 3/2007 | Baker et al. | 382/167 |
| 2008/0088892 A1* | 4/2008 | Cho et al. | 358/504 |
| 2009/0040311 A1* | 2/2009 | Okamoto et al. | 348/181 |
| 2009/0232409 A1* | 9/2009 | Marchesotti | 382/254 |
| 2009/0252371 A1* | 10/2009 | Rao | 382/100 |
| 2010/0119149 A1* | 5/2010 | Hong et al. | 382/167 |
| 2010/0149344 A1 | 6/2010 | Ferguson | |
| 2011/0013844 A1* | 1/2011 | Yamada | 382/207 |
| 2011/0288854 A1* | 11/2011 | Glass et al. | 704/9 |

\* cited by examiner

SYSTEM FOR NATURAL LANGUAGE ASSESSMENT OF RELATIVE COLOR QUALITY

TECHNICAL FIELD

This disclosure relates to picture quality analysis, and, more particularly, to a system that provides an assessment of relative color quality between reference and source images using natural language.

BACKGROUND

Videos are often changed from an original video stream to a modified one. The impetus to change is often related to the bandwidth of the target medium over which the modified video stream will be transmitted, but there are a variety of reason to modify videos. Other reasons for processing video include editing, compression and decompression, reformatting, video insertion and overlay, minimization of transmission errors, and modifying color for different displays, for example.

The video industry imposes limits on color reproduction in the modified video. In other words, the industry establishes standards to which the resultant video must pass to be acceptable. One problem that regularly appears is a color shift from the original to the modified video. Color shift is common in most video processing and difficult to empirically assess because determination of color is physiologically based and therefore necessarily subjective.

Previous methods for detecting such problematic changes in color have either required a) direct viewing of before and after videos, which is time consuming and sometimes both before and after video sources are not simultaneously available for viewing; b) use of vectorscopes or "color" which require trained personnel to interpret, and even then one may be misled because of lack of human vision model, i.e. the brightness of colors is missing so blacks often show up as bright colors on the vectorscope; c) "color" (UV of YUV or RGB based) peak-signal to noise ratio (PSNR) measurement, which can be automated, but also suffers from the issue of lack of human vision model aspects as does the vectorscope solution; d) human vision model type video quality analysis products such as the TEKTRONIX PQA300 quality analyzer can determine if perceptible chance in color has taken place, but it lacks many of the important adaptation mechanisms required to accurately predict how the color is different and, in some cases for particular viewing conditions, even if the color appears different; or e) using more advanced human vision model technology such as a Moving Image Color Appearance Model (MICAM), described in a U.S. Pat. No. 8,355,567 B2, filed on Dec. 10, 2009 entitled METHOD AND APPARATUS FOR IMPLEMENTING MOVING IMAGE COLOR APPEARANCE MODEL FOR VIDEO QUALITY RATINGS PREDICTION, and incorporated by reference herein. The output of the MICAM, however, may be difficult to interpret for an untrained operator and some distinctions in modified video may be difficult even for experts to appreciate.

Embodiments of the invention address these and other limitations in the prior art.

SUMMARY

In some aspects of the invention, a system for generating a natural language objective assessment of relative color quality between a reference and a source image is provided. The system may include a color converter that receives a difference measurement between the reference image and source image and determines a color attribute change based on the difference measurement. The color attributes may include hue shift, saturation changes, and color variation, for instance. Additionally, a magnitude index facility determines a magnitude of the determined color attribute change. Further, a natural language selector maps the color attribute change and the magnitude of the change to natural language and generates a report of the color attribute change and the magnitude of the color attribute change. The output can then be communicated to a user in either text or audio form, or in both text and audio forms.

In other aspects of the invention methods are provided for producing a natural language assessment of relative color quality between a reference image and a source image. These methods may include accepting a color comparison difference measurement between the reference image and the source image and converting the color comparison difference measurement to a two-dimensional color space difference. From the difference a color attribute change is determined, along with a magnitude of the color attribute change, which are mapped to a collection of natural language words to generate a report for the user based on the comparison.

DETAILED DESCRIPTION

Figure 1:
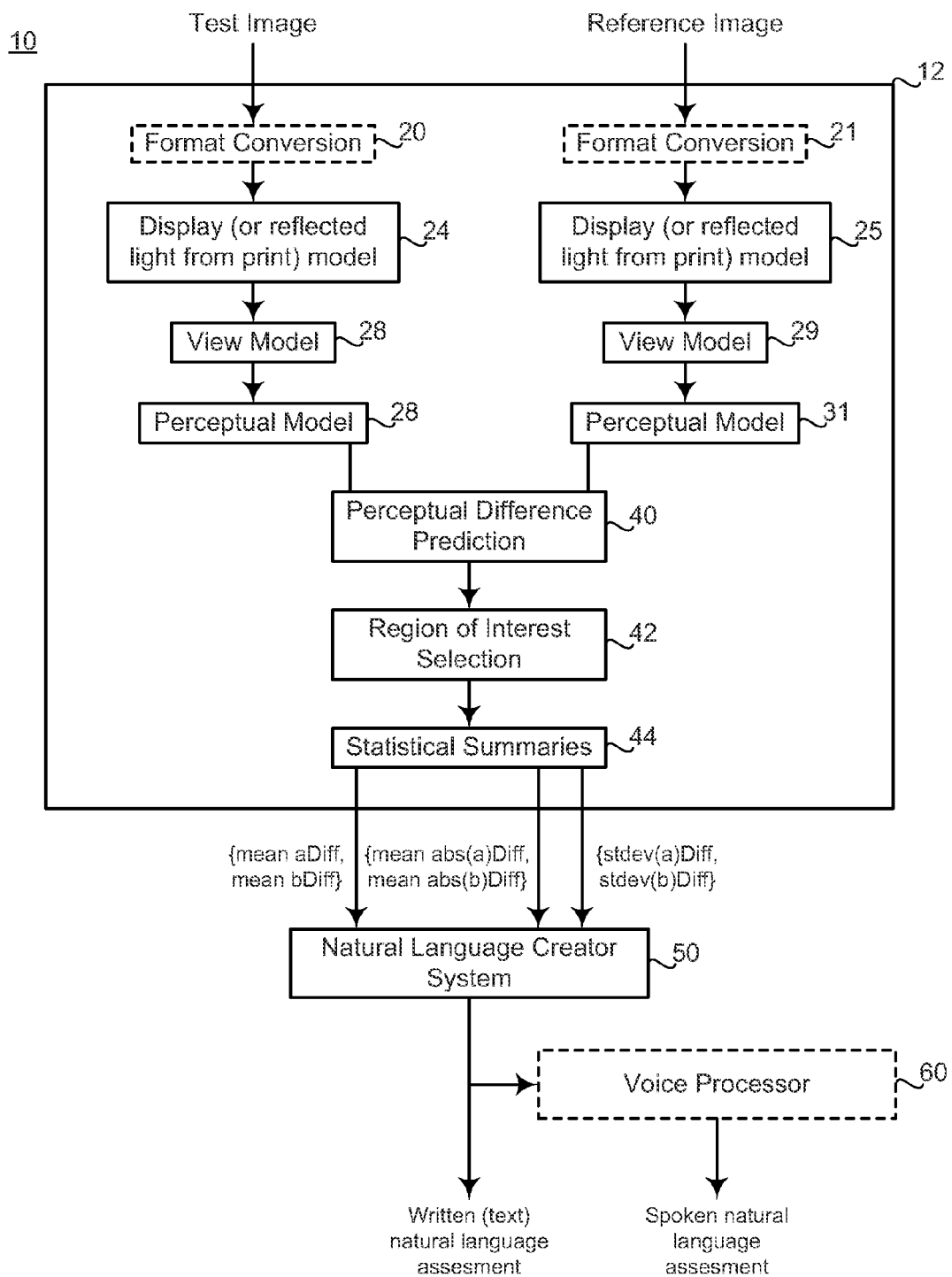
FIG. 1 is a block diagram of a natural language assessment system according to embodiments of the invention.

FIG. 1 is a block diagram of a Natural Language Assessment system 10 according to embodiments of the invention.

For a human watching the modified or processed video vs. the unprocessed video, overall impressions of the video may be summarized as 1) a change in color saturation such as increased saturation or desaturation; or 2) overall shifts in hue of colors, generally made most obvious via shifts in white (i.e. different color temperature or tint change such as whites appearing more green or more magenta/purple); or 3) a combination of change in saturation and overall shift in hue. Embodiments of the invention generate an output in natural language of such a comparison that may be more easily used by video production personnel in assessing modified video.

The natural language assessment system 10 includes an embodiment 12 of MICAM, introduced above. In the MICAM 12, a test image and a reference image, which may also be respective series of images, are received as separate inputs into separate optional format converters 20, 21. The format converter 20, 21 convert the inputs for the display models 24, 25, which in turn convert respective inputs to simulated light for input to the respective view and perceptual models 28, 29, 30, and 31. The respective perceptual models 30, 31 output respective color response per spatial (e.g. pixel) and temporal (e.g. frame) samples in units of CIECAM02 {a,b}. CIECAM02 is the widely known *Color Appearance Modeling for Color Management Systems*, Published in 2002 by the CIE Technical Committee 8-01. These respective {a,b} video responses are used to estimate perceived differences between the reference image(s) and the modified (test) image(s).

In addition to the perceptual models 30, 31, cognitive models, such as found in the TEKTRONIX PQA 500/600 quality analyzers could be added to the system. The region of interest within the images may be selected in a selector 42, which may be a region in either space or time or both. In some embodiments a default region of interest is the entire frame(s) for the entire length of the test and reference image(s). The output of the MICAM 12 is a set of statistical summaries of comparisons between the test and reference images as illustrated in FIG. 1. While the international standards bodies recommend color modeling for static image color patches, CIECAM02, is used as the basis for building a color vision model sufficiently accurate for video. CIECAM02 was designed, calibrated and verified to determine the threshold, direction and magnitude of color differences.

However, the end output of MICAM as described in the above-mentioned '456 application is designed to predict video quality summary scores such as Difference Mean Opinion Score (DMOS) (in addition to PQR, picture quality rating, predictions). While MICAM 12 produces {a,b} coordinates in CIECAM02 color space for test and reference image(s), in turn potentially enabling statistical analysis of test and reference color differences beyond the DMOS and PQR metrics, it does not directly inform a user valuable direct assessment of the color.

Figure 2:
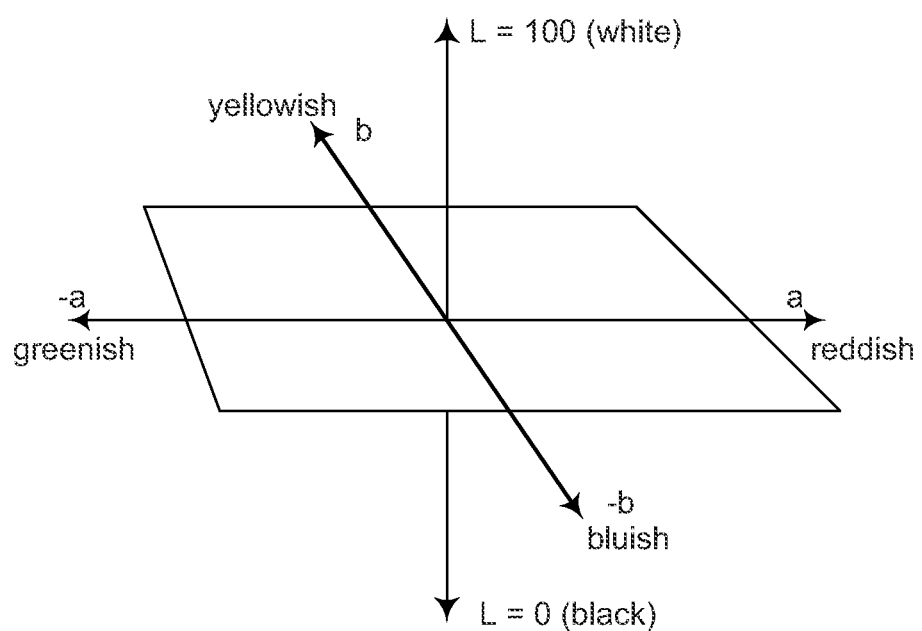
FIG. 2 is a conventional diagram of a two-dimensional framework for describing color according to the CIECAM02 standard.

FIG. 2 is a conventional diagram of a two-dimensional framework for describing color according to the CIECAM02 standard. Lab of the CIECAM02 standard is expressed in rectangular coordinates such as those illustrated in FIG. 2. The framework 80 describes "reddish" to "greenish" along an "a" axis and "yellowish" to "bluish" along a "b" axis. The transverse of the {a,b} plane describes luminance. Both the "a" and "b" axes extend in the positive and negative direction. Colors are described as being on a line in the {a,b} plane extending at a certain angle from the origin, the junction of the "a" and "b" axes. The colors along the line lie at different saturation levels. The CIECAM02 does not, however ascribe a tolerance for how wide any particular color zone is before encroaching on another color. Also, while the CIECAM02 includes a method for determining saturation of an individual color, it addresses no trends in multiple colors nor natural language assessments of changes in colors.

Referring back to FIG. 1, the output of the MICAM 12 is input to the natural language creator system 50, which performs various processes on the data, described below, and compares the input data to thresholds for categorization of hue, quantification superlatives and increase vs. decrease indications. Details and illustrative examples are given with reference to the below figures.

Figure 3:
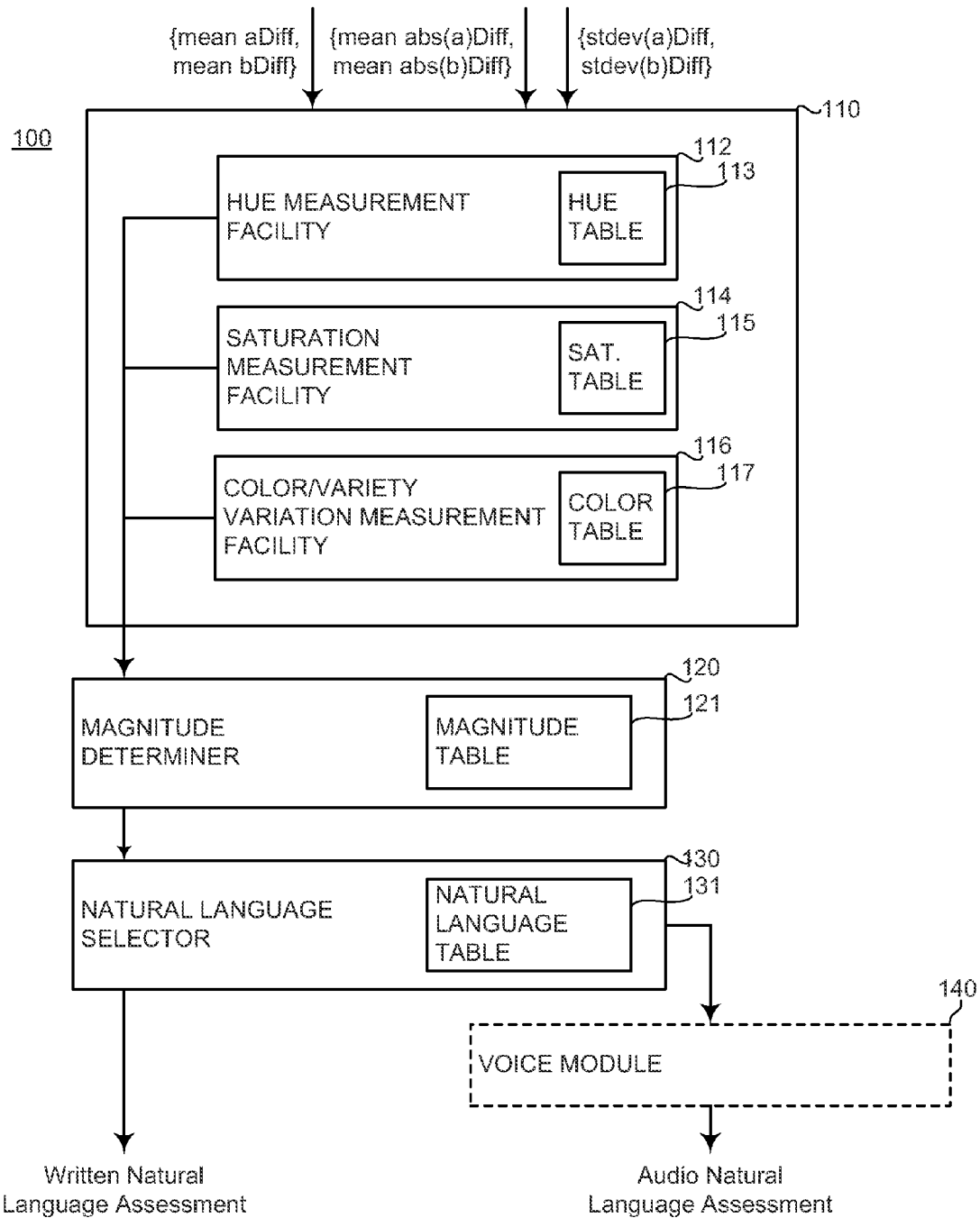
FIG. 3 is a block diagram of an example embodiment of components of the natural language generator system of FIG. 1.

FIG. 3 is a block diagram of an example embodiment 100 of components of the natural language generator system 50 of FIG. 1. The natural language generator system 100 of FIG. 3 includes an attribute measurement portion 110 that includes three sub-systems—a hue measurement facility 112, a saturation measurement facility 114, and a color variety/variation measurement facility 116. These facilities 112, 114, 116 generate an output from inputs received from the MICAM 12 of FIG. 1.

The hue measurement facility 112 generates a measurement of the hue shift of the test image from the reference image (FIG. 1).

Overall Hue Shift

Figure 4:
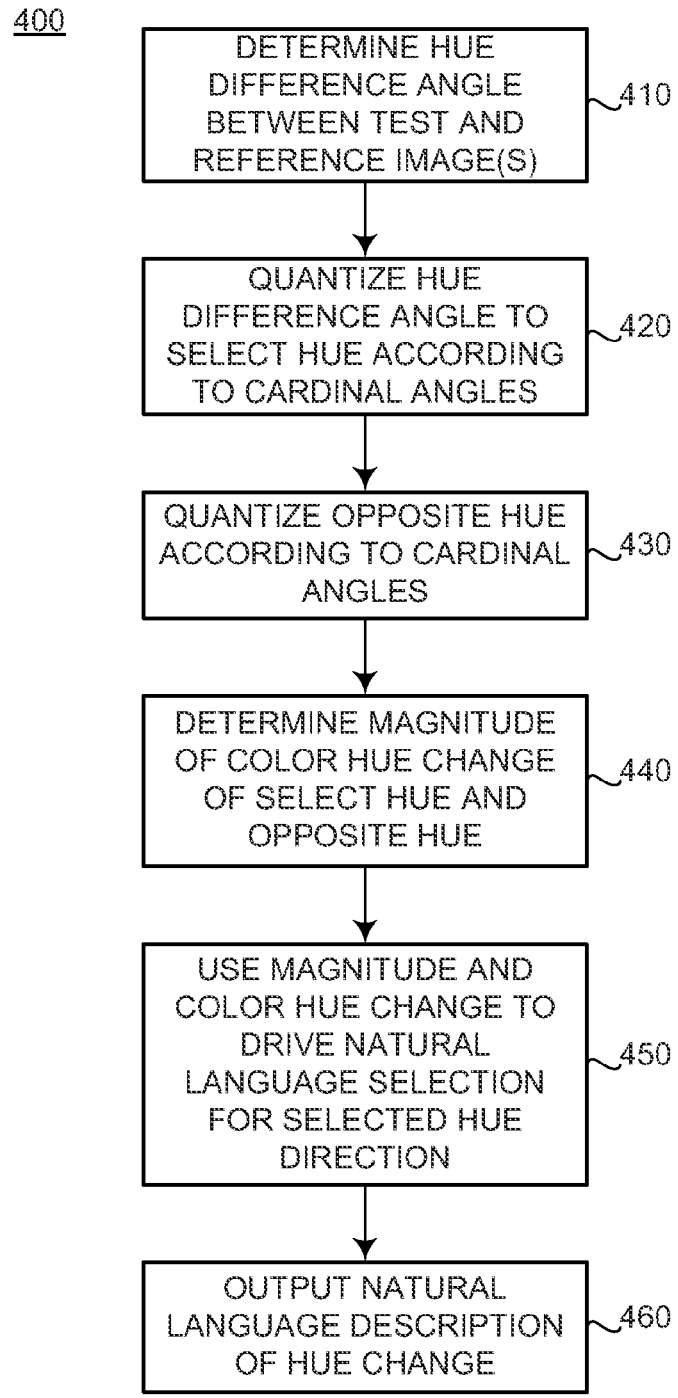
FIG. 4 is a flow diagram of an example process for measuring hue shifts and rendering in natural language according to embodiments of the invention.

The mean test and reference difference data {a,b} (either difference of mean values or the preferred embodiment of the mean of difference values), {mean aDiff, mean bDiff} is taken from the MICAM 12 output and used to determine overall hue shift. The hue shift angle is computed using CIECAM02 hue angle function h(a,b):

$$\text{Mean Hue Difference Angle} = h(\text{mean } aDiff, \text{mean } bDiff)$$
$$= a\tan(\text{mean } bDiff, \text{mean } aDiff),$$

where the a tan function computes unique angles throughout all 4 quadrants of the {a,b} graph of FIG. 2 (i.e. from 0 to 360 degrees). This is illustrated in FIG. 4 as a process 410 of a flow 400.

The mean hue difference angle, or hue angle is then compared in a process 420 against the limits of the cardinal colors as generated based from Optical Society of America's (OSA) jgL equal perceptual increment color space, as described in *Centroids of Color Categories Compared by Two Methods*, Color Research and Application 14(1), 6-15, 1989, by R. M. Boynton and R. E. MacLaury, and K. Uchikawa ("Boynton").

More specifically, data from this reference and similar studies were the bases to determine cardinal hues for describing changes in hue, as well as extreme hue angles for each cardinal hue. These studies used subjects from different cultures and corresponding native speakers of different languages, although the Boynton reference focuses mainly on English and Japanese speakers, and identified large portions of the color space where fundamentally basic color categories reside. For example, the Boynton reference includes plots in OSA (Optical Society of America) gjL (generic image library) color space of pink, red, brown, orange, yellow, green, blue and purple. Because brown largely coincides with red and orange in hue angle (distinguished mainly by brightness/luminance represented by the L axis), it is not used. This leaves pink, red, brown, orange, yellow, green, blue and purple as the cardinal colors. Colors between consecutive cardinal colors may be systematically named using hyphen or slash between the corresponding names. For example, a color that lies between the region of green and yellow is called "green-yellow" or "green/yellow."

The bounds of cardinal colors of the Boynton reference were identified by exhaustively sampling colors across the OSA color space and categorizing each in the cardinal color categories (or none). The set of colors for each cardinal color category were converted form OSA gjL into xyY and then further converted to CIECAM02 {ab} space and corresponding hue angles h(a,b) using the method outlined in the CIECAM02 document.

Overall, color spaces and color difference models of the CIE including CIE 1931 xyY color space (currently common/standard in many photo/spectrum analysis products), include many improvements from the CIE including Luv, Lab (including CIECAM02), and CIE color difference models. Many of these have associated tables with hundreds to thousands of entries of color names and mappings to color space coordinates. One color space that uses a quasi-color naming convention as part of the color space coordinates is the Munsell color space, with an example mapping to CIE xyY as described in *Color Science: Concepts and Methods*, Quantitative Data and Formulas $2^{nd}$ edition, by Gunter Wyszecki and W. S. Stiles, 1982, John Wiley & Sons, NY. However, none of these technologies/standards may be used to directly evaluate video as in the aforementioned PQA and MICAM systems. And further, while the outputs of the PQA and MICAM systems use standard units per pixel per frame (i.e. the output units of are CIE {u,v} and are CIECAM02 {a,b} per location in space and time, respectively), the mappings to color names are too specific to be used for overall color shift analysis, tend to use culture specific language that does not translate well to other languages, and does not take into account the color quantization that tends to take place when opinions of color are formed taken together which fall into categories as in the Boynton reference.

Referring back to FIG. 4, the process 420 illustrates the color comparison and quantization, an embodiment of which is described here with reference to Table 1. Table 1 are the determined bounds of cardinal colors as measured by maximum and minimum angles using the CIECAM02 {ab} space illustrated in FIG. 2. A table such as Table 1 may be stored as a hue table 113 within or coupled to the hue measurement facility 112.

TABLE 1

(Hue Color)

| Color | Minimum Angle | Maximum angle |
| --- | --- | --- |
| Red | 9.761 | 20.549 |
| Orange | 22.549 | 39.399 |
| Yellow | 75.159 | 90.000 |
| Green | 101.780 | 164.250 |
| Blue | 216.551 | 237.530 |
| Purple | 291.772 | 317.314 |
| Pink | 337.464 | 13.290 |

These cardinal hue angles are compared in a process 430 of FIG. 4 with the hue angle determined in the process 410 to quantize the hue into one of the cardinal or "in between cardinal" hues. Colors between consecutive cardinal colors may be systematically named using hyphen or slash between the corresponding names. For example, a color that lies between the region of green and yellow is called "green-yellow" or "green/yellow." Thus, hue category may be established.

With reference back to FIG. 3, the hue category is passed, along with the saturation measurement and color variation measurement described below, to a magnitude determiner 120.

A relative magnitude of color change may be determined by normalizing the vector length of {mean aDiff, mean bDiff} relative to the centroids of the colors within the region of each cardinal color, again using data from the Boynton reference converted to CIECAM02{a,b}, using similar methods as those described above. The reference magnitudes used for normalization are listed in Table 2 and may be included within the magnitude determiner 120 as a magnitude table 121.

TABLE 2

(Opposite Hue Color)

| Color | reference magnitude |
| --- | --- |
| Red | 0.941 |
| RedOrange | 0.948 |
| Orange | 0.956 |
| OrangeYellow | 0.930 |
| Yellow | 0.904 |
| YellowGreen | 0.678 |
| Green | 0.453 |
| GreenBlue | 0.475 |
| Blue | 0.497 |
| BluePurple | 0.444 |
| Purple | 0.392 |
| PurplePink | 0.512 |
| Pink | 0.633 |
| PinkRed | 0.787 |

EXAMPLE 1 angle:=13
mag:=Red 0.12
refMag:=Red
relMag:=mag/refMag
relMag=0.12

For instance, if the hue difference angle is determined to be 13, which would fall in "Red" from Table 1, then the opposite hue falls as "GreenBlue" from Table 2. Further, the magnitude is determined to be 0.12, as illustrated in the above equation. This process is illustrated as 440 in FIG. 4.

The normalized magnitude of change of color is then passed from the magnitude determiner 120 to the natural language selector 130 to select an appropriate quantitative superlative word or phrase from a natural language table 131 according to a set of thresholds for category quantization, for both the hue and opposite hue. This is illustrated as process 450 of FIG. 4.

An example natural language table 131 for particular chromatic shift thresholds is illustrated in Table 3.

TABLE 3

(Superlative Thresholds and quantization bins)

| Quant Bin | Min threshold | Max threshold | Natural Language Superlative |
| --- | --- | --- | --- |
| 0 | 0 | 0.008 | No |
| 1 | 0.009 | 0.048 | Slightly |
| 2 | 0.049 | 0.168 | Noticeably |
| 3 | 0.169 | 0.368 | Somewhat |
| 4 | 0.369 | 0.648 | Considerably |
| 5 | 0.649 | 1.000 | Severely |

Once the hue, opposite hue, and superlatives have been determined by, respectively, the hue measurement facility 112, magnitude determiner 120 and natural language selector 130 of FIG. 3, a natural language sentence comparing the hue of the reference image(s) to the test image(s) may be generated by the natural language selector as follows:

Overall, the video looks {superlative1} more {hue} ({superlative2} less {opposite hue}.

Which, using the data from Example 1 above becomes:

"Overall, the video looks somewhat more red (somewhat less blue-green)."

This is illustrated as process 460 of FIG. 4.

Overall Change in Saturation

Functions of the saturation measurement facility 114 (FIG. 2) are now described with reference to FIG. 2 and FIG. 5.

The saturation measurement facility 114 (FIG. 2) accepts the mean absolute test and reference {mean(|a|,mean(|b|)} from the MICAM 12 (FIG. 1) and uses it to determine overall saturation change between the reference image(s) and the test image(s).

First, the difference between test and reference of these respective values is determined as follows and as illustrated in an example process 510 of an example flow 500 of FIG. 5:

diffOfMeanAbs_a=meanAbsTest_a—meanAbsRef_a where diffOfMeanAbs_a corresponds to "mean Abs(a) Diff" of FIG. 1. Note that mean vs. difference order of operation is interchangeable, while absolute value of a or b comes first.

Figure 5:
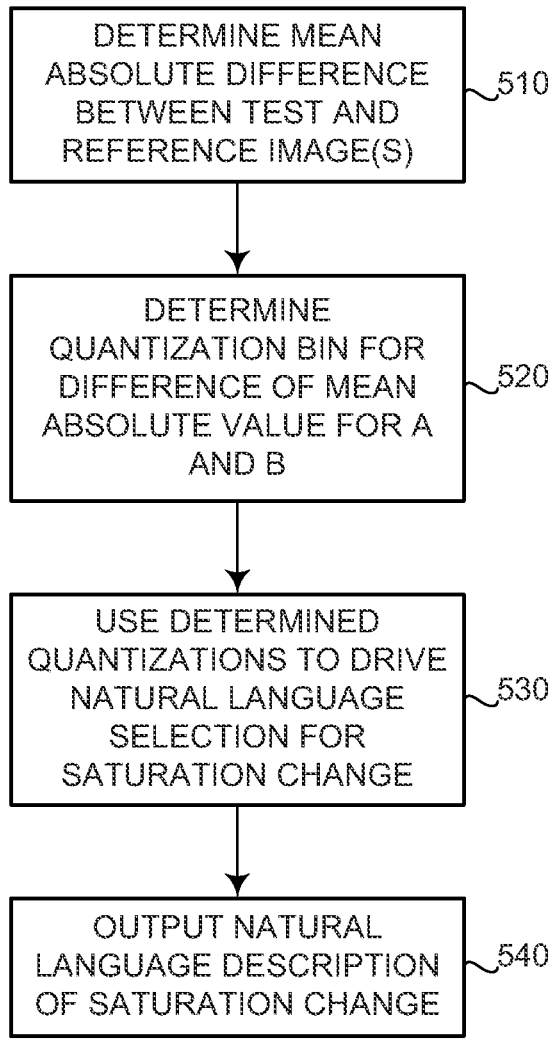
FIG. 5 is a flow diagram of an example process for measuring saturation shifts and rendering in natural language according to embodiments of the invention.

The absolute value of each of diffOfMeanAbs_a and diffOfMeanAbs_b are each respectively then used in a process 520 of FIG. 5 to select an appropriate quantitative superlative word or phrase from the natural language table 131 (FIG. 3) according to the set of thresholds for category quantization, while the respective signs are used to select between "more" or "less":

EXAMPLE 2

If the following values are inputs to the saturation measurement facility 114:

meanAbsTest_a:=0.1 meanAbsRef_a:=0.11
meanAbsTest_b:=0.08 meanAbsRef_b:=0.1
then diffOfMeanAbs_a:=meanAbsTest_a:=meanAbsRef_a=−0.01
diffOfMeanAbs_b:=meanAbsTest_b—meanAbsRef_b=−0.02

First, as described as process 510 of FIG. 5, the distance between the test and reference image(s) is determined as given above. Then, in the process 520, quantization bins of the respective distances are determined, which means to determine which index value corresponds to each of diffOfMeanAbs_a and diffOfMeanAbs_b. If both distances quantize to the same bin (same threshold level of Table 3), then the natural language selector 130 of FIG. 3 may generate the following text to describe the particular condition as illustrated in a processes 530 and 540 of FIG. 5:

Overall, the video color looks {superlative1} {more saturated/desaturated}

Which, using the data from Example 2 becomes:

"Overall, the video color looks slightly desaturated."

EXAMPLE 3

If the following values are inputs to the saturation measurement facility 114:

meanAbsTest_a:=0.3 meanAbsRef_a:=0.11
meanAbsTest_b:=0.08 meanAbsRef_b:=0.1
then diffOfMeanAbs_a:=meanAbsTest_a—meanAbsRef_a=0.19
diffOfMeanAbs_b:=meanAbsTest_b—meanAbsRef_b=−0.02

Here, differently from Example 2, when the quantization bins for "a" and "b" are different according to Table 3, the following text may be generated by the natural language selector 130 of FIG. 3:

Overall, the video has {superlative1} {more saturated/desaturated} reds and/or greens and {superlative2} {more saturated/desaturated} blues and/or yellows.

Which, using the data from Example 3 becomes: "Overall, the video has noticeably more saturated reds and/or greens and slightly desaturated blues and/or yellows.

Overall Change in Color Variety/Variance

The color variety/variation measurement facility 116 (FIG. 2) determines a standard deviation of the test and reference image(s) {stdev(a), stdev(b)} from the MICAM 12 output.

First, a difference between the standard deviations of the test and reference image(s) is determined as follows, as illustrated in process 610 of a flow 600 illustrated in FIG. 6:

diffStdev_a=stdevTest_a—stdevRef_a where diffStdev_a corresponds to "stdev(a)Diff" of FIG. 1.

The absolute value of each of diffStdev_a and diffStdev_b are each respectively then used to select an appropriate quantitative superlative word or phrase from, for example, the natural language table 131 of FIG. 3 according to a set of thresholds for category quantization. The natural language selector 130 of FIG. 3 uses the respective sign of the comparison to select between "more" or "less":

The following example further illustrates this method for overall hue shift measurement translation to natural language:

EXAMPLE 4

If the following values are inputs to the color variety/variation measurement facility 116:

stdevTest_a:=0.1 stdevRev_a:=0.11
stdevTest_b:=0.08 stdevRev_b:=0.1
then diffStdev_a:=stdevTest_a—stdevRef_a=−0.01
diffStdev_b:=stdevTest_b—stdevRef_b=−0.02

The difference in standard deviation of each diffStdev_a and diffStdev_b are compared to the threshold values in the natural language table 131 (FIG. 3) to select the corresponding quantization bin of each value.

Figure 6:
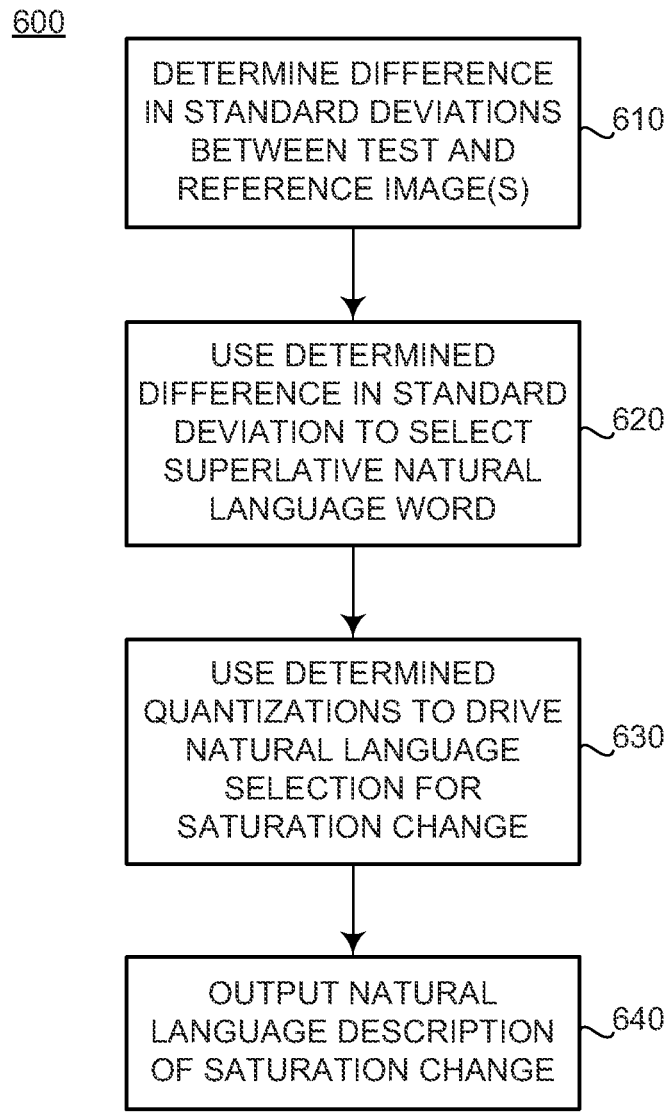
FIG. 6 is a flow diagram of an example process for measuring color variety and/or color variance and rendering in natural language according to embodiments of the invention.

If both diffStdev_a and diffStdev_b quantize to the same value, then the natural language selector 130 of FIG. 3 may generate the following text to describe the particular condition as illustrated in process 630 and 640 of FIG. 6:

Overall, the video has {superlative 1} {more/less} color variety

Which, in this example 4, since the diffStdev_a and diffStdev_b both quantize to bin 1, becomes:

"Overall, the video has slightly less color variety."

EXAMPLE 5

If the following values are inputs to the color variety/variation measurement facility 116:

stdevTest_a:=0.3 stdevRev_a:=0.11
stdevTest_b:=0.08 stdevRev_b:=0.1
then diffStdev_a:=stdevTest_a—stdevRef_a=0.19
diffStdev_b:=stdevTest_b—stdevRef_b=−0.02

The difference in standard deviation of each diffStdev_a and diffStdev_b are compared to the threshold values in the natural language table 131 (FIG. 3) to select the corresponding quantization bin of each value.

When both diffStdev_a and diffStdev_b quantize to different values, then the natural language selector 130 of FIG. 3 may generate the following text to describe the particular condition in processes 630 and 640 of FIG. 6:

Overall, the video has {superlative 1} {more/less} variety in reds and/or greens and {superlative2} {more/less} variety in blues and/or yellows.

Which, in this example 5, since the diffStdev_a quantizes to bin 2 and diffStdev_b quantizes to bin 1, becomes:

"Overall, the video has noticeably more variety in reds and/or greens and slightly less variety in blues and/or yellows.

With reference back to FIG. 1 and FIG. 3, although the above examples have been explained with reference to a textual written language assessment, certain embodiments of the invention additionally include a spoken module 60, 140. The spoken module 60, 140 may include a voice processor structured to accept the natural language assessment from the natural language creator system 50, 130 and generate an audio message of the assessment. These embodiments may be important in some instances where reading the textual messages is inconvenient. For example, a video editor may be editing the modified video in real-time, while watching the video, while embodiments of the invention periodically give vocal prompts of the measured attributes in real-time. In this way the video editor may keep his or her eyes focused on the processed video stream, and need not read reports of the changing color attributes during the editing process, nor need look at the original video.

As described above, embodiments of the invention include a system for providing a natural language objective assessment of relative color quality between a reference and a source image. The system may include a color converter that receives a difference measurement between the reference image and source image and determines a color attribute change based on the difference measurement. The color attributes may include hue shift, saturation changes, and color variation, for instance. Additionally, a magnitude index facility determines a magnitude of the determined color attribute change. Further, a natural language selector maps the color attribute change and the magnitude of the change to natural language and generates a report of the color attribute change and the magnitude of the color attribute change. The output can then be communicated to a user in either text or audio form, or in both text and audio forms.

Although particular embodiments have been described, it will be appreciated that the principles of the invention are not limited to those embodiments. Variations and modifications may be made without departing from the principles of the invention as set forth in the following claims.

What is claimed is:

1. A hardware system for providing a natural language objective assessment of relative color quality between a series of reference images from video images and a series of source images from video images, comprising:
   a processor including:
   a moving image color appearance model structured to determine a difference measurement between selected ones of the reference images and a corresponding source image of the series of source images;
   a color convertor structured to receive the difference measurement and to determine a color attribute change based on the difference measurement;
   a magnitude index facility structured to determine a magnitude of the determined attribute change;
   a natural language selector structured to generate a natural language report of the color attribute change and of the magnitude of the color attribute change; and
   an output module structured to communicate the natural language report to a user of the system.

2. The system for providing a natural language objective assessment of relative color quality between a series of reference images and a series of source images of claim 1, wherein the color converter is a hue shift determination facility, and in which the color attribute change is hue shift between the selected ones of the reference images and the corresponding source image.

3. The system for providing a natural language objective assessment of relative color quality between a series of reference images and a series of source images of claim 1, wherein the color converter is a saturation determination facility, and in which the color attribute change is saturation difference between the selected ones of the reference images and the corresponding source image.

4. The system for providing a natural language objective assessment of relative color quality between a series of reference images and a series of source images of claim 1, wherein the color converter is a color variation determination facility, and in which the color attribute change is a color variety variation between the selected ones of the reference images and the corresponding source image.

5. The system for providing a natural language objective assessment of relative color quality between a series of reference images and a series of source images of claim 1, wherein the output module is a voice synthesis module structured to accept the natural language report and generate an audio report to the user of the system.

6. The system for providing a natural language objective assessment of relative color quality between a series of reference images and a series of source images of claim 1, further comprising a region of interest selector structured to accept user input to delineate boundaries to be included in the assessment, wherein the boundaries are of portions of the series of references images and are of portions of the series of source images.

7. The system for providing a natural language objective assessment of relative color quality between a series of reference images and a series of source images of claim 6, in which the region of interest selector is a spatial selector.

8. The system for providing a natural language objective assessment of relative color quality between a series of reference images and a series of source images of claim 6, in which the region of interest selector is a temporal selector.

9. A method for providing a natural language assessment of relative color quality between a series of reference images from video images and a series of source images from video images, the method comprising:
   determining, via a moving image color appearance model, a color comparison difference measurement between selected ones of the reference images and a corresponding source image of the series of source images, wherein the color comparison difference measurement is within a region of interest in space and/or time;
   accepting, at a processor and from the moving image color appearance model, an input of the color comparison difference measurement;
   converting, via the processor, the color comparison difference measurement to a two-dimensional color space difference;
   determining, via the processor, a color attribute change based on the two-dimensional color space difference;
   determining, via the processor, a magnitude of the color attribute change;
   mapping, via the processor, the magnitude of the color attribute change to one of a collection of natural language words;
   generating, via the processor, from the mapped magnitude, and from the two-dimensional color space difference, the natural language assessment;
   outputting, via the processor, the natural language assessment.

10. The method providing a natural language assessment of relative color quality between a series of reference images and a series of source images of claim 9, wherein the two-dimensional color space accords to CIECAM02.

11. The method providing a natural language assessment of relative color quality between a series of reference images and a series of source images of claim 9, wherein determining a color attribute change comprises determining a hue shift between the selected ones of the reference images and the corresponding source image.

12. The method providing a natural language assessment of relative color quality between a series of reference images and a series of source images of claim 9, wherein determining a color attribute change comprises determining a saturation measurement between the selected ones of the reference images and the corresponding source image.

13. The method providing a natural language assessment of relative color quality between a series of reference images and a series of source images of claim 9, wherein determining a color attribute change comprises determining a color variation measurement between the selected ones of the reference images and the corresponding source image.

14. The method providing a natural language assessment of relative color quality between a series of reference images and a series of source images of claim 9, further comprising selecting, for assessment, the region of interest.

15. The method providing a natural language assessment of relative color quality between a series of reference images and a series of source images of claim 9, further comprising generating an audio report of the natural language assessment.

* * * * *